United States Patent
Lin et al.

(10) Patent No.: US 7,250,878 B2
(45) Date of Patent: Jul. 31, 2007

(54) DECODING DEVICE WITH MULTI-BUFFERS AND DECODING METHOD THEREOF

(75) Inventors: Evelyn Lin, Shindian (TW); Amanda Chou, Shindian (TW); James Tsai, Shindian (TW)

(73) Assignee: VIA Technologies Inc., Taipei (TW)

( * ) Notice: Subject to any disclaimer, the term of this patent is extended or adjusted under 35 U.S.C. 154(b) by 0 days.

(21) Appl. No.: 11/331,022

(22) Filed: Jan. 13, 2006

(65) Prior Publication Data

US 2006/0152394 A1 Jul. 13, 2006

Related U.S. Application Data

(60) Provisional application No. 60/643,174, filed on Jan. 13, 2005.

(51) Int. Cl.
*H03M 7/40* (2006.01)
(52) U.S. Cl. ............... 341/67; 375/240.2; 375/240.23; 382/245
(58) Field of Classification Search ............ 341/67, 341/50, 51; 348/390.1, 714; 382/245, 233; 375/240.2, 240.23, 240.27
See application file for complete search history.

(56) References Cited

U.S. PATENT DOCUMENTS

| | | | | |
|---|---|---|---|---|
| 5,473,378 A | * | 12/1995 | Tamitani | 375/240.15 |
| 5,528,315 A | * | 6/1996 | Sugiyama | 348/714 |
| 5,574,504 A | * | 11/1996 | Yagasaki et al. | 375/240.13 |
| 5,699,117 A | * | 12/1997 | Uramoto et al. | 348/390.1 |
| 5,715,009 A | * | 2/1998 | Tahara et al. | 375/240.23 |
| 6,134,382 A | * | 10/2000 | Mishima et al. | 386/68 |
| 6,525,783 B1 | * | 2/2003 | Kim et al. | 348/714 |
| 6,556,625 B2 | * | 4/2003 | Haskell et al. | 375/240.2 |
| 6,658,154 B2 | * | 12/2003 | Kohiyama et al. | 382/233 |
| 6,704,360 B2 | * | 3/2004 | Haskell et al. | 375/240.12 |
| 6,704,363 B1 | * | 3/2004 | Kim | 375/240.27 |
| 2002/0114528 A1 | * | 8/2002 | Tanaka et al. | 382/245 |

* cited by examiner

*Primary Examiner*—Jean Bruner Jeanglaude
(74) *Attorney, Agent, or Firm*—Birch, Stewart, Kolasch & Birch, LLP

(57) ABSTRACT

A decoding device includes a variable-length decoding circuit, a first buffer, a second buffer and a DC/AC prediction circuit is disclosed. The variable length decoding circuit decodes a first block and a second block from a compressed media stream. The first and second buffers are electrically coupled with the variable-length decoding circuit to store the first block and the second blocks, respectively. The DC/AC prediction circuit is electrically coupled with the first buffer and the second buffer. The DC/AC prediction circuit may read the first block from the first buffer when the second buffer is storing the second block.

18 Claims, 10 Drawing Sheets

|   |   |   |   |   |   |   |   |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 2A

| Address | Buffer 12 | | | | | | | |
|---|---|---|---|---|---|---|---|---|
| 00h-07h | 0 | 1 | 5 | 6 | 14 | 15 | 27 | 28 |
| 08h-0Fh | 2 | 4 | 7 | 13 | 16 | 26 | 29 | 42 |
| 10h-17h | 3 | 8 | 12 | 17 | 25 | 30 | 41 | 43 |
| 18h-1Fh | 9 | 11 | 18 | 24 | 31 | 40 | 44 | 53 |
| 20h-27h | 10 | 19 | 23 | 32 | 39 | 45 | 52 | 54 |
| 28h-2Fh | 20 | 22 | 33 | 38 | 46 | 51 | 55 | 60 |
| 30h-37h | 21 | 34 | 37 | 47 | 50 | 56 | 59 | 61 |
| 38h-3Fh | 35 | 36 | 48 | 49 | 57 | 58 | 62 | 63 |

Zigzag Scan Sequence

FIG. 2B

Address      Buffer 12

| Addr | | | | | | | | |
|---|---|---|---|---|---|---|---|---|
| 00h-07h | 0 | 1 | 2 | 3 | 10 | 11 | 12 | 13 |
| 08h-0Fh | 4 | 5 | 8 | 9 | 17 | 16 | 15 | 14 |
| 10h-17h | 6 | 7 | 19 | 18 | 26 | 27 | 28 | 29 |
| 18h-1Fh | 20 | 21 | 24 | 25 | 30 | 31 | 32 | 33 |
| 20h-27h | 22 | 23 | 34 | 35 | 42 | 43 | 44 | 45 |
| 28h-2Fh | 36 | 37 | 40 | 41 | 46 | 47 | 48 | 49 |
| 30h-37h | 38 | 39 | 50 | 51 | 56 | 57 | 58 | 59 |
| 38h-3Fh | 52 | 53 | 54 | 55 | 60 | 61 | 62 | 63 |

Alternate Horizontal Scan Sequence

FIG. 2C

Address      Buffer 12

| Addr | | | | | | | | |
|---|---|---|---|---|---|---|---|---|
| 00h-07h | 0 | 4 | 6 | 20 | 22 | 36 | 38 | 52 |
| 08h-0Fh | 1 | 5 | 7 | 21 | 23 | 37 | 39 | 53 |
| 10h-17h | 2 | 8 | 19 | 24 | 34 | 40 | 50 | 54 |
| 18h-1Fh | 3 | 9 | 18 | 25 | 35 | 41 | 51 | 55 |
| 20h-27h | 10 | 17 | 26 | 30 | 42 | 46 | 56 | 60 |
| 28h-2Fh | 11 | 16 | 27 | 31 | 43 | 47 | 57 | 61 |
| 30h-37h | 12 | 15 | 28 | 32 | 44 | 48 | 58 | 62 |
| 38h-3Fh | 13 | 14 | 29 | 33 | 45 | 49 | 59 | 63 |

Alternate Vertical Scan Sequence

FIG. 2D

Address  Buffer 12

| | | | | | | | | |
|---|---|---|---|---|---|---|---|---|
| 00h-07h | 0 | 2 | 3 | 9 | 10 | 20 | 21 | 35 |
| 08h-0Fh | 1 | 4 | 8 | 11 | 19 | 22 | 34 | 36 |
| 10h-17h | 5 | 7 | 12 | 18 | 23 | 33 | 37 | 48 |
| 18h-1Fh | 6 | 13 | 17 | 24 | 32 | 38 | 47 | 49 |
| 20h-27h | 14 | 16 | 25 | 31 | 39 | 46 | 50 | 57 |
| 28h-2Fh | 15 | 26 | 30 | 40 | 45 | 51 | 56 | 58 |
| 30h-37h | 27 | 29 | 41 | 44 | 52 | 55 | 59 | 62 |
| 38h-3Fh | 28 | 42 | 43 | 53 | 54 | 60 | 61 | 63 |

Inter Macroblock Zigzag Scan Sequence

FIG. 2E

Inverse Scan Address Addr₁

Count Value

| | 0 | 1 | 2 | 3 | 4 | 5 | 6 | 7 |
|---|---|---|---|---|---|---|---|---|
| 00-07 | 0 | 1 | 5 | 6 | 14 | 15 | 27 | 28 |
| 08-15 | 2 | 4 | 7 | 13 | 16 | 26 | 29 | 42 |
| 16-23 | 3 | 8 | 12 | 17 | 25 | 30 | 41 | 43 |
| 24-31 | 9 | 11 | 18 | 24 | 31 | 40 | 44 | 53 |
| 32-39 | 10 | 19 | 23 | 32 | 39 | 45 | 52 | 54 |
| 40-47 | 20 | 22 | 33 | 38 | 46 | 51 | 55 | 60 |
| 48-55 | 21 | 34 | 37 | 47 | 50 | 56 | 59 | 61 |
| 56-63 | 35 | 36 | 48 | 49 | 57 | 58 | 62 | 63 |

Zigzag Scan Sequence

FIG. 6A

Inverse Scan Address Addr₂

Count Value

| | 0 | 1 | 2 | 3 | 4 | 5 | 6 | 7 |
|---|---|---|---|---|---|---|---|---|
| 00-07 | 0 | 1 | 2 | 3 | 10 | 11 | 12 | 13 |
| 08-15 | 4 | 5 | 8 | 9 | 17 | 16 | 15 | 14 |
| 16-23 | 6 | 7 | 19 | 18 | 26 | 27 | 28 | 29 |
| 24-31 | 20 | 21 | 24 | 25 | 30 | 31 | 32 | 33 |
| 32-39 | 22 | 23 | 34 | 35 | 42 | 43 | 44 | 45 |
| 40-47 | 36 | 37 | 40 | 41 | 46 | 47 | 48 | 49 |
| 48-55 | 38 | 39 | 50 | 51 | 56 | 57 | 58 | 59 |
| 56-63 | 52 | 53 | 54 | 55 | 60 | 61 | 62 | 63 |

Alternate Horizontal Scan Sequence

FIG. 6B

Inverse Scan Address Addr$_3$

| Count Value | | | | | | | | |
|---|---|---|---|---|---|---|---|---|
| 00-07 | 0 | 4 | 6 | 20 | 22 | 36 | 38 | 52 |
| 08-15 | 1 | 5 | 7 | 21 | 23 | 37 | 39 | 53 |
| 16-23 | 2 | 8 | 19 | 24 | 34 | 40 | 50 | 54 |
| 24-31 | 3 | 9 | 18 | 25 | 35 | 41 | 51 | 55 |
| 32-39 | 10 | 17 | 26 | 30 | 42 | 46 | 56 | 60 |
| 40-47 | 11 | 16 | 27 | 31 | 43 | 47 | 57 | 61 |
| 48-55 | 12 | 15 | 28 | 32 | 44 | 48 | 58 | 62 |
| 56-63 | 13 | 14 | 29 | 33 | 45 | 49 | 59 | 63 |

Alternate Vertical Scan Sequence

FIG. 6C

Inverse Scan Address Addr$_4$

| Count Value | | | | | | | | |
|---|---|---|---|---|---|---|---|---|
| 00-07 | 0 | 2 | 3 | 9 | 10 | 20 | 21 | 35 |
| 08-15 | 1 | 4 | 8 | 11 | 19 | 22 | 34 | 36 |
| 16-23 | 5 | 7 | 12 | 18 | 23 | 33 | 37 | 48 |
| 24-31 | 6 | 13 | 17 | 24 | 32 | 38 | 47 | 49 |
| 32-39 | 14 | 16 | 25 | 31 | 39 | 46 | 50 | 57 |
| 40-47 | 15 | 26 | 30 | 40 | 45 | 51 | 56 | 58 |
| 48-55 | 27 | 29 | 41 | 44 | 52 | 55 | 59 | 62 |
| 56-63 | 28 | 42 | 43 | 53 | 54 | 60 | 61 | 63 |

Inter Macroblock Zigzag Scan Sequence

FIG. 6D

DECODING DEVICE WITH MULTI-BUFFERS AND DECODING METHOD THEREOF

This application claims the benefit of priority by provisional application No. 60/643,174, filed on Jan. 13, 2005.

BACKGROUND OF THE INVENTION

1. Field of Invention

The invention relates to a decoding device and a decoding method thereof and, in particular, to a decoding device and a decoding method thereof, which have multi-buffers for performing data-write and data-read operations simultaneously during an inverse scan stage.

2. Related Art

Video compression technology has been developed rapidly in the recent years. To decode and display the compressed video more quickly and correctly, many powerful decoding devices have been produced.

For example, in so-called MPEG or H.24X standard, a source video is compressed by means of a serial of processes, such as motion compensation, frequency transformation, quantization, scan, and variable-length encoding (VLC), etc. Herein, the frequency transformation is implemented by using a well-known discrete cosine transform (DCT) or discrete wavelet transform (DWT).

After transforming the source video into a frequency domain, the frequency coefficients of the source video are quantized and scanned. Because those high frequency coefficients usually contribute less influence on the video quality, which indicates that they are adaptive to remove for reducing the video size. Thereafter, a VLC compression is performed to compress the remaining frequency coefficients so as to compress the source video completely.

In addition, when restoring a compressed video, a variable-length decoding (VLD) and an inverse scan function are performed firstly. Thereafter, an inverse discrete cosine transform (IDCT) or inverse discrete wavelet transform (IDWT) is performed.

FIG. 1 shows a conventional decoding device 1 including a variable-length decoder (VLD) 11, a buffer 12, and a DC/AC predictor 13. In this case, the VLD 11 receives a compressed media stream 111, and then decodes and stores a block 121 from the compressed media stream 111. Because the block 121 is compressed by following a specific video standard during a data-compression stage, the VLD 11 may perform an inverse scan function (e.g. zigzag scan) to store the coefficients of the block 121 into the buffer 12. For example, FIG. 2A is a schematic diagram showing an inverse scan sequence after VLD 11 decodes the block 121. Please note that those decoded coefficients are lined from left to right firstly rather than from top to bottom. The VLD 11 performs an inverse scan function to respectively store the 0, 1, 2, 3 . . . 61, 62, 63 coefficients of the block 121 in the address 00h, 01h, 08h, 11h . . . 38h, 3Eh and 3Fh of the buffer 12 in the sequence of the arrow shown in the FIG. 2B.

In addition, FIGS. 2C to 2E demonstrate different sequences provided by commonly used inverse scan functions besides the aforementioned zigzag scan. For example, an inverse scan function may be implemented by following an alternately horizontal scan sequence (showed in the FIG. 2C) or an alternately vertical scan sequence (showed in the FIG. 2D) in MPEG-4, or it may be implemented with an inter macroblock zigzag scan sequence (showed in the FIG. 2E) in the DIVX-311 format. The VLD 11 is adaptive for the above inverse scan functions when storing the coefficients of the block 121 in the buffer 12 in response to the format of the block 121.

Please refer to FIG. 1 again, the DC/AC predictor 13 reads the block 121 from the buffer 12 in the address sequence. When the compressed media stream 111 is compressed based on the MPEG-1 or MPEG-2 standard, the DC/AC predictor 13 reads and outputs the block 121 directly so that the block 121 is applied to the IDCT or other further processing. However, when the compressed media stream 111 is compressed according to the MPEG-4 standard, what kind of the inverse scan function performed to the current block may depend on the previous block. Therefore, the DC/AC predictor 13 performs a DC/AC prediction to the block 121 so as to decide what kind of inverse scan functions is adaptive for the next block. Thereafter, the block 121 is outputted and performed to IDCT or other further processing.

However, when the buffer 12 stores data therein, the DC/AC predictor 13 cannot read any data from the buffer 12 at the same time. On the other hand, the buffer 12 still cannot perform any data-storing operation to the buffer 12 when the DC/AC predictor 13 reads data from the buffer 12. Consequently, the DC/AC predictor 13 and the buffer 12 must wait for each other to accomplish their current manipulating processes, and then activate associated read or store operation respectively.

It is therefore a subject of the invention to provide a decoding device and method, which alleviates the bottleneck caused by buffer unable to store and read data at the same time so as to improve the inverse scan performance during the decoding process.

SUMMARY OF THE INVENTION

In view of the foregoing, the invention is to provide a multi-buffer decoding device and decoding method thereof, which are able to alleviate the bottleneck of the buffer.

To achieve the above, a decoding device of the invention includes a variable-length decoding circuit, a first buffer, a second buffer and a DC/AC prediction circuit. The variable-length decoding circuit decodes a first block and a second block from a compressed media stream, and then stores the first and second blocks into the first and second buffers, respectively. The DC/AC prediction circuit may read the first block from the first buffer when the second block is being stored into the second buffer.

In addition, the invention also discloses a decoding method includes the steps as follows. After a first block from a compressed media stream has been decoded and is being stored into the first buffer, a second block is then decoded. The first block is then read from the first buffer when the second block is being stored in the second buffer.

As mentioned above, because the multi-buffer decoding device and the decoding method thereof of the invention provide a first buffer and a second buffer for respectively storing the first and second blocks, the operations of storing the second block and reading the first block can be performed simultaneously. Performance of the inverse scan function is therefore upgraded while employing the disclosed decoding process. Furthermore, the bottleneck caused by the buffer is alleviated due to the time-cost of waiting for buffers is significantly degraded.

BRIEF DESCRIPTION OF THE DRAWINGS

The invention will become more fully understood from the detailed description given herein below illustration only, and thus is not limitative of the present invention, and wherein:

FIGS. 2A to 2E are schematic diagrams showing the inverse scan sequences in the conventional decoding device;

FIGS. 6A to 6D are schematic diagrams showing the inverse scan sequences in the decoding device according to another embodiment of the invention.

DETAILED DESCRIPTION OF THE INVENTION

The application will be described below with reference to relevant drawings, wherein the same elements are referred with the same reference numbers.

Figure 1:
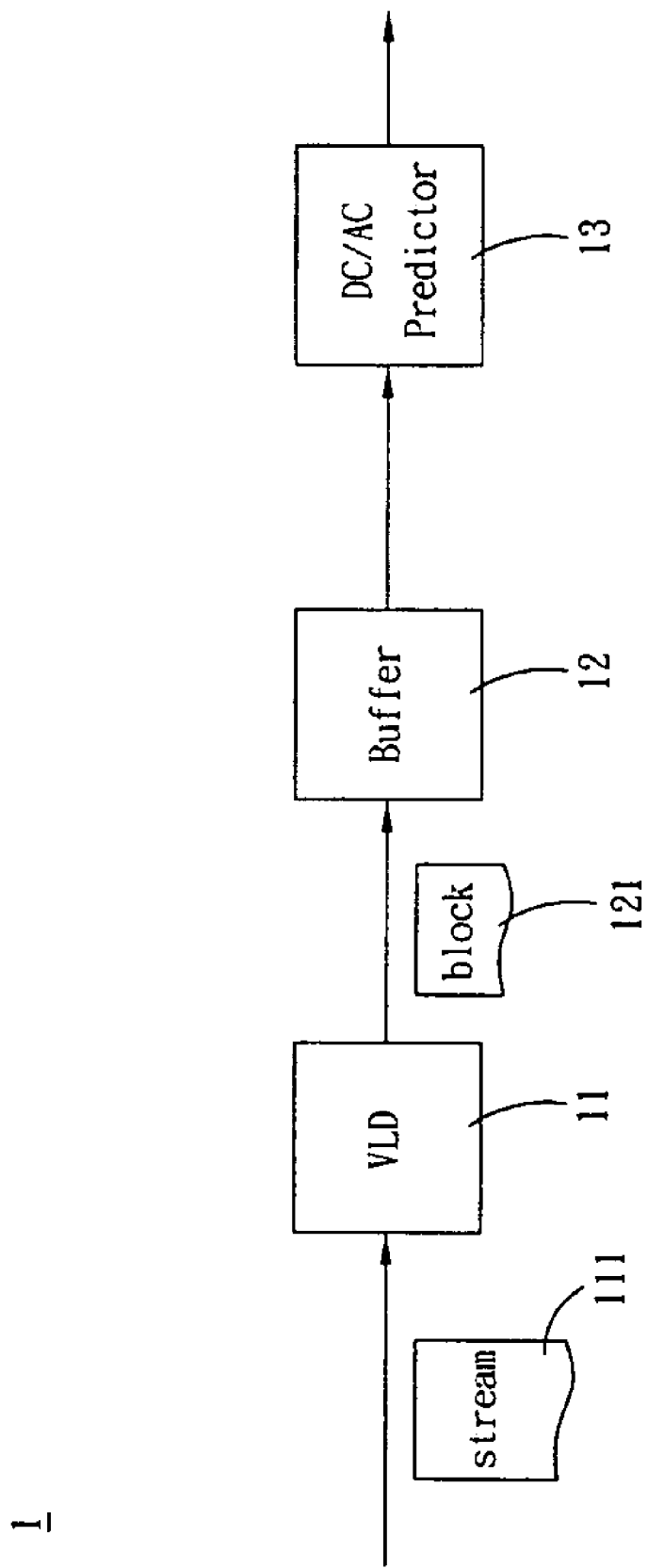
FIG. 1 is a block diagram showing the conventional decoding device.
Figure 3:
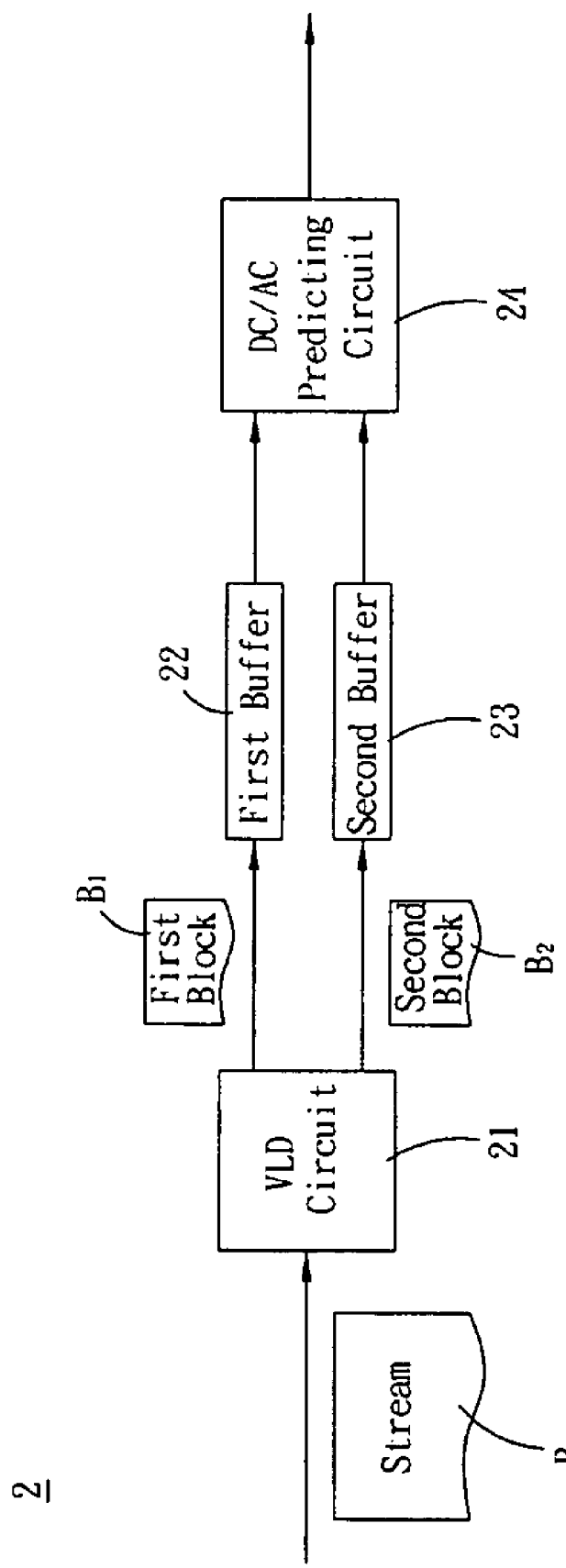
FIG. 3 is a block diagram showing a decoding device according to an embodiment of the invention.

Referring to FIG. 3, a decoding device 2 according to an embodiment of the invention includes a variable-length decoding (VLD) circuit 21, a first buffer 22, a second buffer 23, and a DC/AC prediction circuit 24.

In the embodiment, the VLD circuit 21 decodes a first block $B_1$ and a second block $B_2$ from a compressed media stream $B_{stream}$. The first buffer 22 is electrically coupled with the VLD circuit 21 to store the first block $B_1$. Similarly, the second buffer 23 is electrically coupled with the VLD circuit 21 to store the second block $B_2$. The DC/AC prediction circuit 24 is electrically coupled with the first buffer 22 and the second buffer 23. While the second buffer 23 is storing the second block $B_2$, the DC/AC prediction circuit 24 might read the first block $B_1$ from the first buffer 22.

After the DC/AC prediction circuit 24 finishes the operation of reading the first block $B_1$ from the first buffer 22, the VLD circuit 21 decodes and stores a third block accessed from the compressed media stream $B_{stream}$ (not showed in the FIG. 3) into the first buffer 22. When the first buffer 22 is storing the third block, the DC/AC prediction circuit 24 might read the second block $B_2$ from the second buffer 23. In comparison with the prior art, the DC/AC prediction circuit 24 can read data from the block stored in the first buffer 22 or the buffer 23 even another data-storing operation is being performed, such that the DC/AC prediction circuit 24 does not need to halt for waiting any buffer storing operation. Thus, the bottleneck result from the single buffer can be overcome so as to raise the decoding efficiency.

In the embodiment, the compressed media stream $B_{stream}$ is video or audio in compliance with MPEG or H.26X standard. In addition, the first block $B_1$ and the second block $B_2$ may be whole or a portion of a macro block. Herein, the transferring coefficients of the first or second blocks are DC coefficients or AC coefficients.

Furthermore, the VLD circuit 21 stores the 0, 1, 2 . . . 62, 63 coefficients of the first block $B_1$ at the addresses 00h, 01h, 02h . . . 3Eh, 3Fh of the first buffer 22 in FIFO sequence. Then, the VLD circuit 21 stores the 0, 1, 2 . . . 62, 63 coefficients of the second block $B_2$ at the addresses 00h, 01h, 02h . . . 3Eh, 3Fh of the second buffer 23 also by following a FIFO sequence. While the second buffer 23 is storing the second block $B_2$, the DC/AC prediction circuit 24 might perform an inverse scan function to read the first block B1 from the first buffer 22. The inverse scan function may be implemented with a well-known zigzag scan, alternately horizontal scan sequence, alternately vertical scan sequence, or inter macroblock zigzag scan sequence in the DIVX-311 format.

When the first block $B_1$ and the second block $B_2$ are compressed with MPEG-4 or MPEG-4 compliance, the DC/AC prediction circuit 24 predicts the type of (or format) the inverse scan function of the block $B_2$ based on the first block $B_1$. The block $B_1$ is outputted from the DC/AC prediction circuit 24, and performed with IDCT and further processing.

Figure 4:
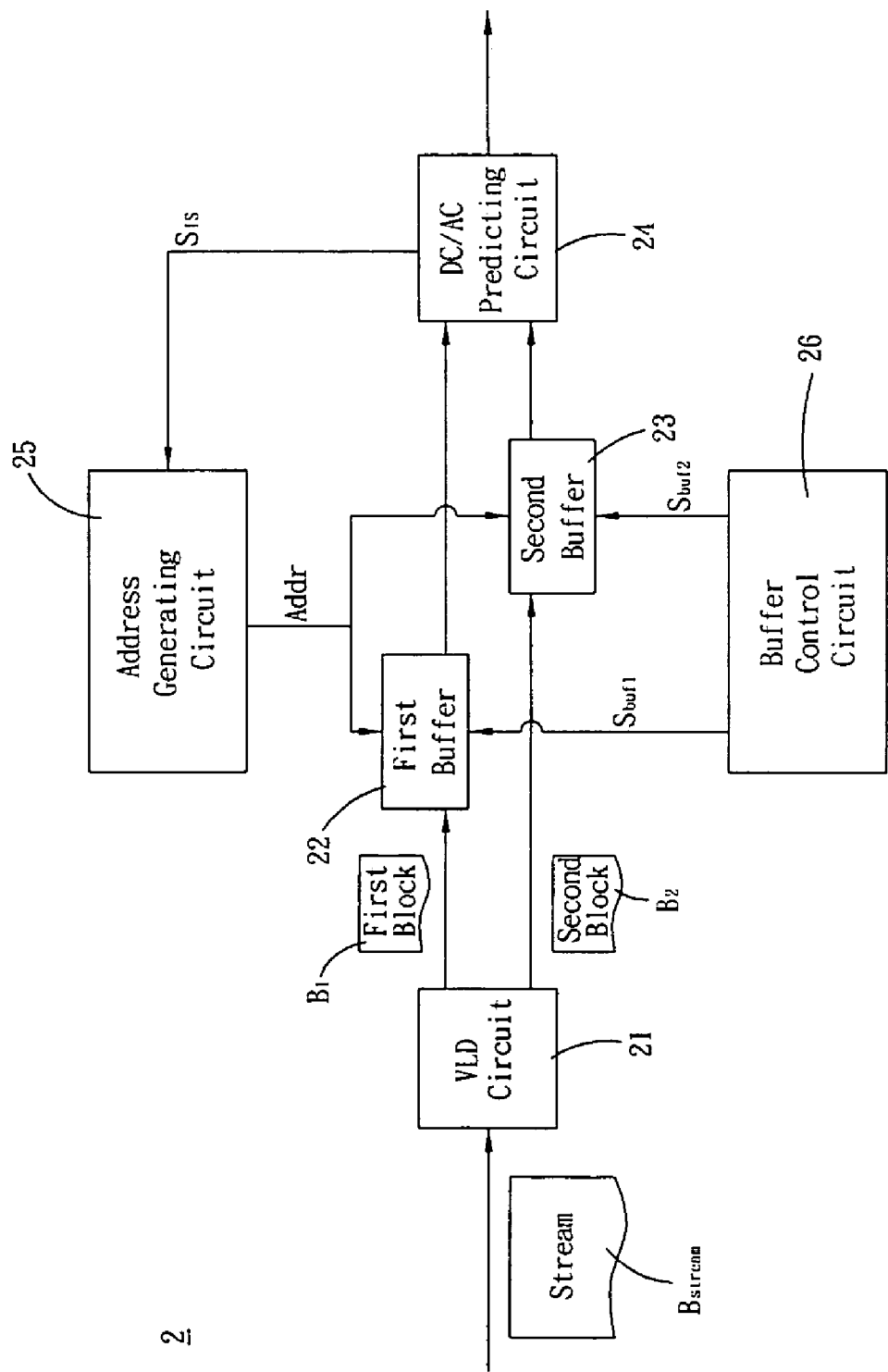
FIG. 4 is a block diagram showing a decoding device according to another embodiment of the invention.
Figure 5:
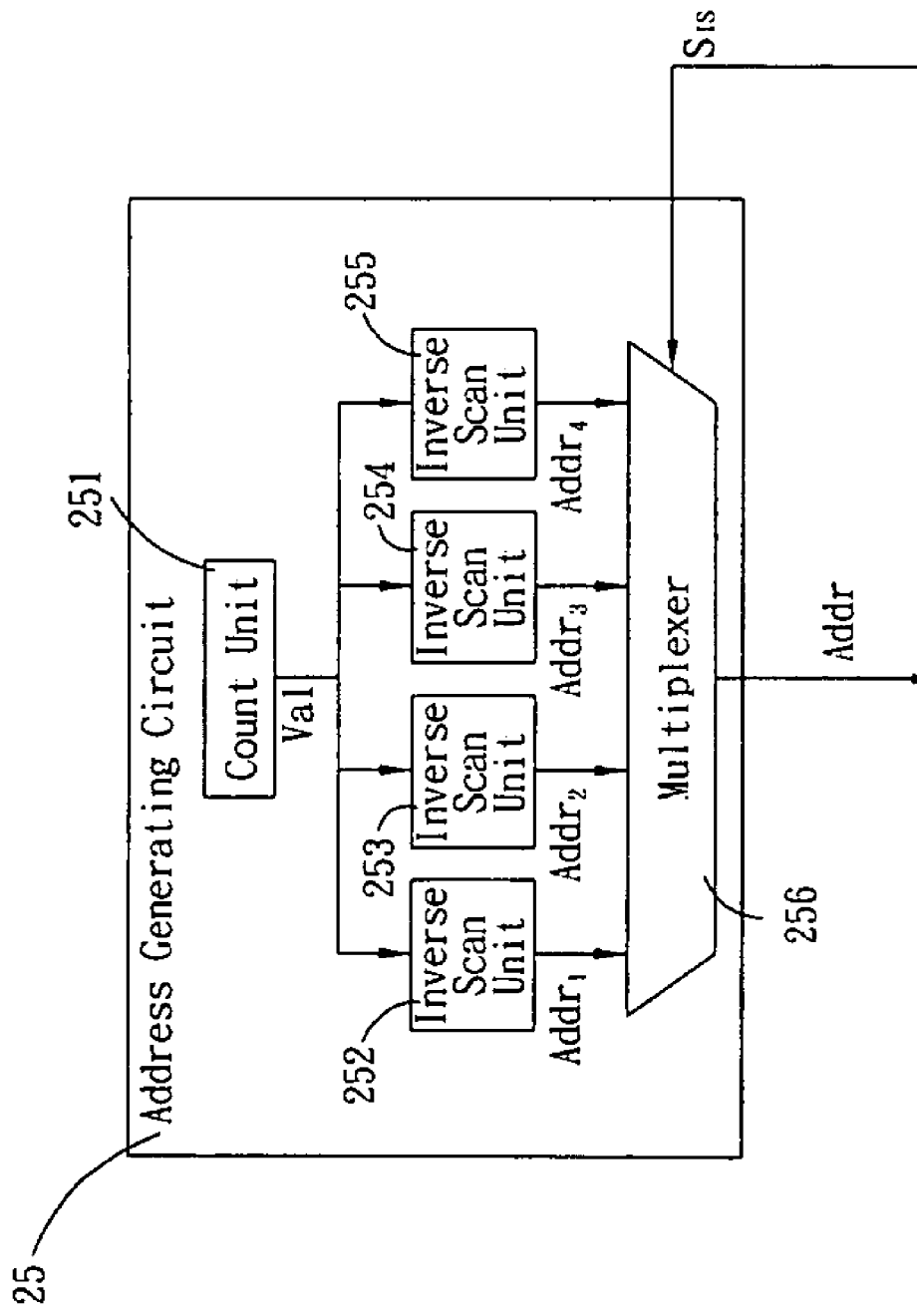
FIG. 5 is a block diagram showing an address generating circuit of the decoding device according to another embodiment of the invention.

Referring to FIGS. 4 and 5, another embodiment of the invention shows the decoding device 2 further including an address generating circuit 25 and a buffer control circuit 26 therein. Herein, the address generating circuit 25 generates an address according to an inverse scan selecting signal $S_{IS}$, which is generated by the transferring coefficient prediction circuit 24 and one of a plurality of inverse scan sequences.

In the embodiment, the address generating circuit 25 includes a count unit 251, an inverse scan units 252~255, and a multiplexer 256. Herein, the count unit 251 generates a count value Val. The count value Val increases 1 when the DC/AC prediction circuit 24 read one coefficient each time, and the range of the count value Val is restricted within 0 to 63. The count value Val is reset to 0 when the increasing 1 operation is performed at count value 63. The inverse scan units 252~255 generate inverse scan addresses $Addr_1$~$Addr_4$ based on the count value Val and respectively based on the zigzag scan, the alternately horizontal scan, the alternately vertical scan, and the inter macroblock zigzag scan.

In the embodiment, the count value Val increases from 00 to 63 progressively, and the inverse scan addresses Addr, changes from 00h, 05h, 06h, 14h, 15h . . . to 38h, 3Eh, and 3Fh in corresponding sequence based on the zigzag scan (as shown in FIG. 6A). Similarly, the inverse scan addresses $Addr_2$ to $Addr_4$ are generated respectively based on the alternately horizontal scan, the alternately vertical scan, and the inter macroblock zigzag scan, and their relationships between the count value Val and the inverse scan addresses $Addr_2$ to $Addr_4$ are shown in the FIGS. 6B to 6D. After the inverse scan addresses $Addr_1$ to $Addr_4$ are generated, the multiplexer 256 selects one of the addresses $Addr_1$~$Addr_4$ as the address Addr according to the inverse scan selecting signal $S_{IS}$.

The DC/AC prediction circuit 24 reads the transferring coefficients of the first block $B_1$ from the first buffer 22 according to the address Addr. When the DC/AC prediction circuit 24 reads the second block $B_2$ next to the first block $B_1$, the DC/AC prediction circuit 24 generates the inverse scan signal $S_{IS}$ according to the first block $B_1$. Therefore, the address Addr is generated according to the proper inverse scan sequence selected by the inverse scan selecting signal $S_{IS}$. Hence, the DC/AC prediction circuit 24 reads the second block $B_2$ accompanied with performing a proper inverse scan function based on the address Addr. In conclusion, the DC/AC prediction circuit 24 can perform the inverse scan function after it reads required data from the buffer.

The buffer control circuit 26 generates the buffer control signals $S_{buf1}$ and $S_{buf2}$ respectively to control the first buffer 22 and the second buffer 23 from being written or read. In detailed, the buffer control circuit 26 controls the first buffer 22 to perform a data-storing operation and at the same time controls the second buffer 23 to perform data-read operation by using the buffer control signals $S_{buf1}$ and $S_{buf2}$. Otherwise, the buffer control circuit 26 controls the second buffer 23 to perform related data-storing and at the same time controls the first buffer 22 to perform data-read operation still by means of the buffer control signals $S_{buf1}$ and $S_{buf2}$. That is to say, data might be written into the second buffer 23 while a data in the first buffer 22 can be readable therefrom. Similarly, a data in the second buffer 23 might be readable therefrom while a data can be written into the first buffer 22 in the embodiment. Thus, while the VLD circuit 21 writes the first block $B_1$ into the first buffer 22 or writes the second $B_2$ into the second buffer 23, the transferring coefficients prediction circuit 24 would not read the buffer which is being written currently.

Figure 7:
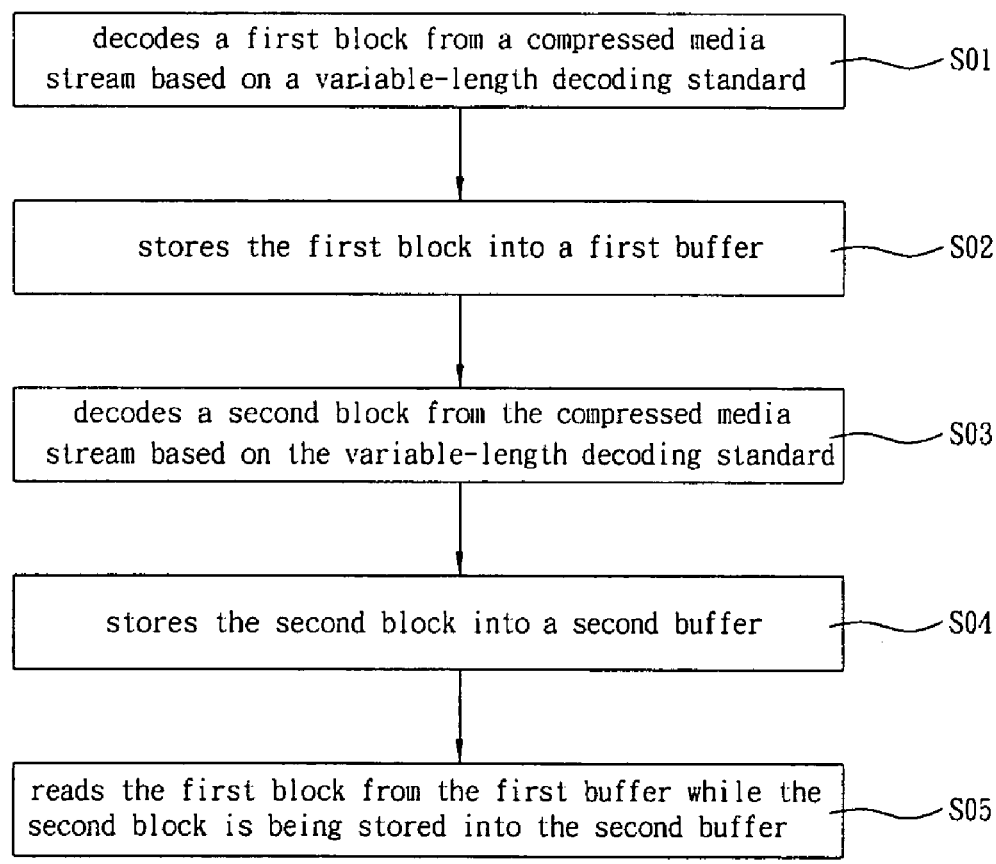
FIG. 7 is a flow chart showing a decoding method according to an embodiment of the invention.

Referring to FIG. 7, a multi-buffer decoding method according to an embodiment of the invention includes the following steps S01 to S05.

The step S01 decodes a first block from a compressed media stream based on a variable-length decoding standard.

The step S02 stores the first block into a first buffer.

The step S03 decodes a second block from the compressed media stream based on the variable-length decoding standard.

The step S04 stores the second block into a second buffer.

The step S05 reads the first block from the first buffer while the second block is being stored into the second buffer.

In the embodiment, the step S02 may store the first block into the first buffer based on a sequence of transferring coefficients in the first block. The step S04 may store the second block into the second buffer based on a sequence of transferring coefficients in the second block. The step S05 may read the first block from the first buffer based on an inverse scan sequence.

In addition, in the embodiment, the multi-buffer decoding method may further generate an address according to an inverse scan selecting signal and one of a plurality of inverse scan sequences. In this step, a count value is generated at first, and then an inverse scan sequence is selected according to the inverse scan selecting signal. Finally, the address is generated according to the selected inverse scan sequence and the count value.

Thus, the step S05 reads the transferring coefficients in the first block from the first buffer according to the generated address. In addition, the step S02 writes the transferring coefficients in the first block into the first buffer according to the address. The step S04 writes the transferring coefficient in the second block into the second buffer according to the address.

On the other hand, in the embodiment, the multi-buffer decoding method may further generate a buffer control signal to control one of the first buffer and the second buffer to be writable or readable.

The multi-buffers decoding method in the embodiment can be applied to the multi-buffer decoding device as mentioned in the above embodiment in FIGS. 3 to 5. Thus, the multi-buffer decoding method of the invention can be realized with referring to the previous embodiment, and the detailed descriptions are omitted here.

As mentioned above, because the multi-buffer decoding device and the decoding method thereof of the invention provide a first buffer and a second buffer for respectively storing the first and second blocks, the operations of storing the second block and reading the first block can be performed simultaneously. Performance of the inverse scan function is therefore upgraded while employing the disclosed decoding process. Furthermore, the bottleneck caused by the buffer is alleviated due to the time-cost of waiting for buffers is significantly degraded.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A decoding device, comprising:
   a variable-length decoding circuit decoding a first block and a second block from a compressed media stream;
   a first buffer electrically coupled with the variable-length decoding circuit to store the first block;
   a second buffer electrically coupled with the variable-length decoding circuit to store the second block; and
   a DC/AC prediction circuit electrically coupled with the first buffer and the second buffer, wherein the DC/AC prediction circuit may read the first block from the first buffer when the second buffer is storing the second block.

2. The decoding device as recited in claim 1, wherein the first block and the second block is whole of a macro block or a portion of the macro block.

3. The decoding device as recited in claim 1, wherein the first buffer block stores the first block based on a sequence of transferring coefficients in the first block.

4. The decoding device as recited in claim 1, wherein the second buffer block stores the second block based on a sequence of transferring coefficients in the second block.

5. The decoding device as recited in claim 1, wherein the DC/AC prediction circuit reads the first block from the first buffer based on an inverse scan sequence.

6. The decoding device as recited in claim 1, further comprising:
   an address generating circuit generating an address according to an inverse scan selecting signal generated by the DC/AC prediction circuit and one of a plurality of inverse scan sequences.

7. The decoding device as recited in claim 6, wherein the address generating circuit comprises:
   a counting unit generating a count value;
   a plurality of inverse scan unit generating inverse scan addresses according to the inverse scan sequences and the count value; and
   a multiplexer generating the address according to the inverse scan selecting signal and one of the inverse scan addresses.

8. The decoding device as recited in claim 6, wherein the DC/AC prediction circuit reads a transferring coefficient in the first block from the first buffer according to the address.

9. The decoding device as recited in claim 1, further comprising a buffer control circuit generating a buffer control signal to control one of the first buffer and the second buffer to be writable or readable.

10. A decoding method, comprising:
    decoding a first block from a compressed media stream based on a variable-length decoding standard;
    storing the first block into a first buffer;
    decoding a second block from the compressed media stream based on the variable-length decoding standard;
    storing the second block into a second buffer; and reading the first block from the first buffer when the second block is being stored into the second buffer.

11. The decoding method as recited in claim 10, wherein the first block and the second block is whole of a macro block or a portion of the macro block.

12. The decoding device as recited in claim 10, wherein the step of storing the first block in the first buffer is to store the first block based on a sequence of transferring coefficients in the first block.

13. The decoding device as recited in claim 10, wherein the step of storing the second block in the second buffer is to store the second block based on a sequence of transferring coefficients in the second block.

14. The decoding method as recited in claim 10, further comprising:
    reading the first block from the first buffer based on an inverse scan sequence.

15. The decoding method as recited in claim 10, further comprising:
    generating an address according to an inverse scan selecting signal and one of a plurality of inverse scan sequences.

16. The decoding method as recited in claim 15, further comprising:
    generating a count value;
    selecting one of the inverse scan sequences; and
    generating the address according to the selected inverse scan sequence and the count value.

17. The decoding method as recited in claim 15, further comprising:
    reading a transferring coefficient in the first block from the first buffer according to the address.

18. The decoding method as recited in claim 10, further comprising:
    generating a buffer control signal to control one of the first buffer and the second buffer to be writable or readable.

* * * * *